Patented Aug. 7, 1928.

1,680,055

UNITED STATES PATENT OFFICE.

HELMUT LEGERLOTZ, OF BERLIN, GERMANY.

MONOOXY-ω-AMINOACETOPHENONE DERIVATIVES.

No Drawing. Application filed March 23, 1927, Serial No. 177,829, and in Austria March 22, 1926.

This invention relates to certain derivatives of monohydroxy-ω-aminoacetophenones which are intended for use as starting materials in the manufacture of other compounds having valuable therapeutical properties.

The said derivatives have the general formula

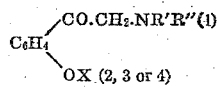

in which R' means hydrogen or a monovalent hydrocarbon radical, R'' means a monovalent hydrocarbon radical and X means hydrogen or a monovalent hydrocarbon radical.

As indicated by the numerals in parentheses, the substituents of the nucleus may be either in ortho position or in meta or para position to each other.

The invention further refers to processes for manufacturing the said derivatives.

According to this invention the said derivatives carrying substituents in the amino group are obtained by acting on hydroxy-ω-halogenacetophenone derivatives of the general formula

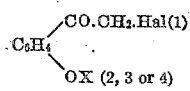

(Hal meaning a halogen and X meaning hydrogen or a monovalent hydrocarbon radical) with mono- or dialkylamines (including aralkyl substitution products, such as benzylamine) or mono- or diarylamines or mixed amines in which one alkyl (or aralkyl) and one aryl substituent is contained.

In this reaction the corresponding hydrohalogenic acids are split off and bound to an excess of the amine present and from the reaction mixture the compounds carrying substituents in the amino group as above referred to may be separated.

The derivatives having the general formula

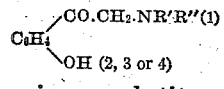

in which there is no substituent in the hydroxyl group, can also be prepared by using as starting materials acyloxy-ω-halogenacetophenones having the general formula

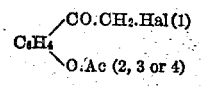

in which for the hydrogen atom of the hydroxyl group an acid radical is substituted, and acting on these compounds with the substituted amines above referred to. The acid radical is split off either during or after the reaction.

*Example 1.*—19 grams of p-hydroxy-ω-bromacetophenone are dissolved in 25 cubic centimeters of alcohol of 96% strength and to this solution 40 cubic centimeters of an aqueous methylamine solution of about 40% strength are gradually added in small portions, the reaction mixture being well cooled. After 24 hours' standing at ordinary temperature and partly evaporating the excess of methylamine, the crystalline deposit obtained is separated from the solution on a suction filter and washed with alcohol. The p-hydroxy-ω-methylaminocacetophenone obtained and having the structural formula

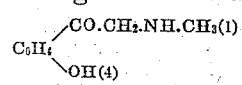

is purified by redissolving one or two times with alcohol and then forms brilliant colourless leaflets having the melting point of 147–148° C. These leaflets can also be obtained by precipitation with ammonia from the aqueous solution of the hydrochloride of the base. This hydrochloride when crystallized from alcohol forms crystals having the melting point 239–240° C.

*Example 2.*—2.15 grams of p-hydroxy-ω-bromacetophenone are dissolved in benzene and to this solution 1.46 grams of diethylamine are added. After about half an hour's standing the solution is separated by means of a suction filter from the diethylaminehydrobromide precipitated. From the benzolic solution the base is extracted by shaking with water to which hydrochloric acid has been added, and the hydrochloric solution is evaporated to dryness at a gentle temperature. The residue is dissolved in absolute alcohol and ether is added, thereupon after some time p-hydroxy-ω-diethylaminoacetophenone having the structural formula

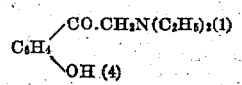

is separated in compact crystalline druses having a melting point of 177–178° C.

*Example 3.*—5 grams of p-methoxy-ω-bromacetophenone are made into suspension with 3 cubic centimeters of alcohol of 96% strength. Then, 8 cubic centimeters of an aqueous methylamine solution of 40% strength are slowly added while cooling. A resinous mass is first separated and after some days' standing a yellow crystalline mass is also separated. Both precipitates are separated from the solution by filtration and the resinous mass is then removed from the mixture by washing with dilute alcohol. The remaining crystalline mass is p-methoxy-ω-methylaminoacetophenone having the structural formula.

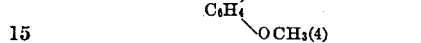

Example 4.—42 grams of p-benzoyloxy-ω-bromacetophenone are made into suspension with 50 cubic centimeters of alcohol of 96% strength and 50 cubic centimeters of an aqueous methylamine solution of 40% strength are then slowly added within about 4 hours while stirring and well cooling. When the mixture is allowed to stand for some time, a crystalline mass is separated which is increased when the alcohol is evaporated. The crude base is separated on a suction filter and transformed into its hydrochloride which is purified by re-dissolving and separating it by means of alcohol of 70% strength. The base obtained from this hydrochloride is p-hydroxy-ω-methylaminoacetophenone having the structural formula.

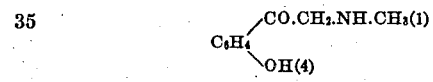

During the reaction the benzoyl group is split off, benzoicacidethylester being formed.

Example 5.—6.4 grams of p-benzoyloxy-ω-bromacetophenone are agitated during some hours with 250 cubic centimeters of ether and 5 grams of diethylamine. The ethereal solution is separated from the precipitate of diethylaminehydrobromide and the p-benzoyloxy-ω-diethylaminoacetophenone having the structural formula

is extracted from the solution by means of water to which hydrochloric acid has been added. This aqueous solution is then heated to boiling for about one hour at a reflux cooler, the benzoic acid formed is removed by means of ether, to the hydrochloric solution an excess of ammonia is added and the p-hydroxy-ω-diethylaminoacetophenone having the structural formula

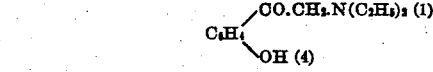

is extracted by means of ether. The residue obtained from the etheral solution is neutralized with hydrochloric acid and brought to dryness and the remaining crystalline mass is purified by re-dissolving and separating by means of alcohol, crystals of p-hydroxy-ω-diethylaminoacetophenone-hydrochloride having the structural formula

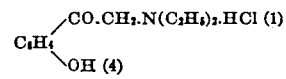

being obtained which crystals have a melting point of 194° C.

What I claim is:—

1. The hereinbefore described monohydroxy-ω-aminoacetophenone derivatives carrying substituents in the amino group and having the general formula

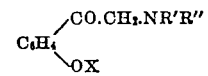

in which R' means hydrogen or a monovalent hydrocarbon radical, R" means a monovalent hydrocarbon radical and X means hydrogen or a monovalent hydrocarbon radical.

2. The hereinbefore described process of preparing monohydroxy-ω-aminoacetophenone derivatives carrying substituents in the amino group and having the general formula

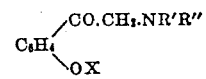

in which R' means hydrogen or a monovalent hydrocarbon radical, R" means a monovalent hydrocarbon radical and X means hydrogen or a monovalent hydrocarbon radical, said process consisting in acting upon hydroxy-ω-halogenacetophenone derivatives having the general formula,

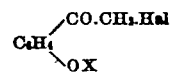

in which Hal means a halogen and X means hydrogen or a monovalent hydrocarbon radical with an amine having the general formula

in which R' means hydrogen or a monovalent hydrocarbon radical and R" means a monovalent hydrocarbon radical.

3. The hereinbefore described process of preparing monohydroxy-ω-aminoacetophenone derivatives carrying substituents in the amino group and having the general formula

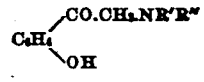

in which R' means hydrogen or a monovalent hydrocarbon radical and R" means a monovalent hydrocarbon radical, which process consists in acting upon acyloxy-ω-halogenacetophenones having the general formula

in which Hal means a halogen and Ac an acyl group with an amine having the general formula

NH.R'R'' in which R' means hydrogen or a monovalent hydrocarbon radical and R'' means a monovalent hydrocarbon radical, the acyl group being split off during the reaction.

4. The hereinbefore described process of preparing monohydroxy-ω-aminoacetophenone derivatives carrying substituents in the amino group and having the general formula

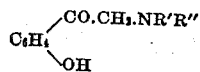

in which R' means hydrogen or a monovalent hydrocarbon radical and R'' means a monovalent hydrocarbon radical, which process consists in acting upon acyloxy-ω-halogenacetophenones having the general formula

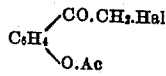

in which Hal means a halogen and Ac an acyl group with an amine having the general formula

NH.R'R'' in which R' means hydrogen or a monovalent hydrocarbon radical and R'' means a monovalent hydrocarbon radical, and then splitting off the acyl group.

5. The hereinbefore described p-hydroxy-ω-methylaminoacetophenone having the structural formula

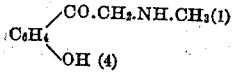

and forming brilliant colourless leaflets having the melting point of 147–148° C. and being soluble in warm alcohol, sparingly soluble in cold alcohol, insoluble in water, nearly insoluble in ether, acetone or benzene, and forming, with hydrochloric acid, a hydrochloride crystallizing from alcohol in crystals having a melting point of 239–240° C.

6. The hereinbefore described process of preparing p-hydroxy-ω-methylaminoacetophenone having the structural formula

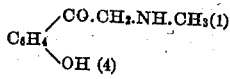

which process consists in acting in alcoholic suspension with methylamine on p-benzoyloxy-ω-bromacetophenone having the structural formula

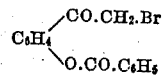

separating the crystalline mass from the reaction mixture and purifying it by transforming it into a hydrochloride, recrystallizing the latter and separating the base therefrom.

In testimony whereof I have affixed my signature.

HELMUT LEGERLOTZ.